UNITED STATES PATENT OFFICE

DURAIN C. BUTTS, OF DOVER, NEW JERSEY, ASSIGNOR TO HERCULES POWDER COMPANY, OF WILMINGTON, DELAWARE, A CORPORATION OF DELAWARE

PROCESS FOR PURIFYING ROSIN

No Drawing.    Application filed October 16, 1926. Serial No. 142,159.

My invention relates to an improved process for purifying rosin, and more especially for eliminating the color body present in rosin which on aging of the rosin, and especially on aging of rosin soaps, imparts a dark brown color.

Heretofore rosin soaps, and especially those soaps made from wood rosin, obtained by extraction of light wood, have shown a distinct darkening of color on aging. Various methods have been devised for treating rosin to eliminate the color body, the presence of which results in the darkening of the color of the rosin soaps, but while certain methods have resulted in a substantial improvement in the capacity of rosin soap to retain its color, the problem has not heretofore been perfectly solved.

Now in accordance with my invention I provide a process for the treatment of rosin by which the color body present in the rosin, which imparts the dark brown color, is substantially eliminated.

The process in accordance with my invention consists essentially in distilling the rosin in the presence of an inert gas as, for example, carbon dioxide, nitrogen, or the like, under reduced pressure and at a temperature at which the rosin will not be decomposed.

By the use of my invention the particular color body which imparts the dark brown color will be decomposed and will be prevented from reforming. Thus, the treated rosin will have practically no tendency to darken and soaps produced from it will retain their color on aging.

In the carrying out of the process involving my invention no special form of apparatus is required, any usual form of distilling apparatus being usable.

As a practical illustration of the carrying out of the process involving my invention, the rosin is placed in a still, suitably connected to a condenser, and heated sufficiently to melt it. A current of inert gas, as carbon dioxide, is bubbled through the molten rosin in the still, displacing the air or oxygen from the still, condenser and connecting pipes and its flow continued throughout the distillation. The temperature of the rosin in the still is then raised to about 300° C., but not substantially in excess thereof, and the pressure in the still reduced to an extent sufficient to prevent decomposition of the rosin at that temperature. The vacuum may be from about 15 to 29 inches of mercury, depending on the progress of the distillation.

The distilled rosin will be found to be light in color and will form a soap of much improved color and one which will tend to a greatly increased degree to retain its color on aging.

The distillation of the rosin in a vacuum and in the presence of an inert gas, as carbon dioxide, causes the color body sought to be eliminated to be decomposed while at a temperature not substantially in excess of 300° C. and with reduction of pressure, the rosin itself will not be decomposed. The decomposed color body is prevented from reforming by the presence of the inert gas or conversely by the absence of oxygen, the presence of which is required for its reformation.

It will be understood that my invention is not limited to the carrying out of the process in any particular apparatus and it will be further understood that the temperature and degree of vacuum at which the distillation is carried out may be substantially varied without departing from my invention, it being only necessary that the temperature and degree of vacuum be such that distillation of the rosin without decomposition thereof, will occur and that the color body be decomposed and prevented from reforming by the presence of an inert gas which will eliminate the presence of oxygen and prevent the reformation of the decomposed color body.

Having now fully described my invention, what I claim and desire to protect by Letters Patent is:—

The method of treating wood rosin which includes heating wood rosin to a temperature sufficient to melt it without effecting substantial decomposition in an atmosphere of carbon dioxide and then subjecting the wood rosin under reduced pressure to a temperature of about 300° C. in an atmosphere of carbon dioxide to effect distillation without substantial decomposition of the wood rosin.

In testimony of which invention, I have hereunto set my hand at Kenore, N. J., on this 1st day of October, 1926.

DURAIN C. BUTTS.